June 23, 1964 D. R. ZUCK 3,138,351

FOLDING WINGS ON AIRCRAFT

Original Filed Dec. 11, 1959 7 Sheets-Sheet 1

June 23, 1964 D. R. ZUCK 3,138,351

FOLDING WINGS ON AIRCRAFT

Original Filed Dec. 11, 1959

7 Sheets-Sheet 2

INVENTOR.
Daniel R. Zuck

June 23, 1964

D. R. ZUCK 3,138,351

FOLDING WINGS ON AIRCRAFT

Original Filed Dec. 11, 1959

7 Sheets-Sheet 3

INVENTOR.
Daniel R. Zuck

INVENTOR.
Daniel R. Zuck

June 23, 1964 D. R. ZUCK 3,138,351

FOLDING WINGS ON AIRCRAFT

Original Filed Dec. 11, 1959 7 Sheets-Sheet 5

INVENTOR.
Daniel R. Zuck

INVENTOR.
Daniel R. Zuck

June 23, 1964
D. R. ZUCK
3,138,351
FOLDING WINGS ON AIRCRAFT
Original Filed Dec. 11, 1959
7 Sheets-Sheet 7
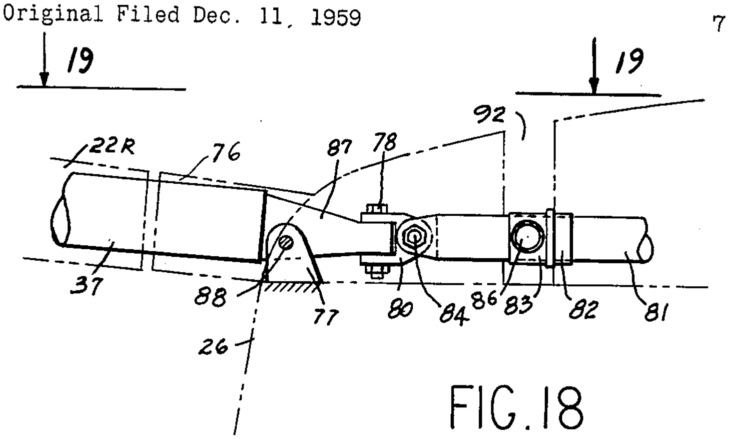
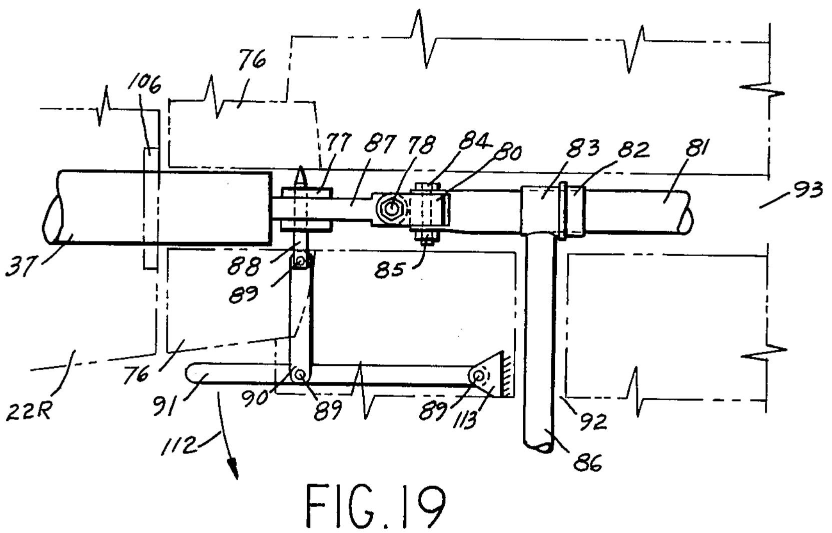
FIG.19
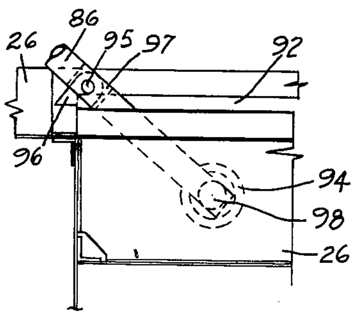
FIG.21
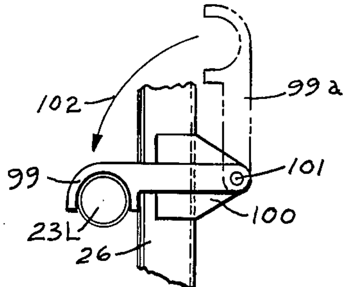
FIG.20
INVENTOR.
Daniel R. Zuck 3,138,351

FOLDING WINGS ON AIRCRAFT

Daniel R. Zuck, 14273 Beaver St., San Fernando, Calif.

Continuation of application Ser. No. 858,976, Dec. 11, 1959. This application Aug. 10, 1962, Ser. No. 216,706
11 Claims. (Cl. 244—49)

This invention relates to aircraft, the method of folding the wings on aircraft, and improvement of wing folding mechanisms. This application is a companion to my patent application Roadable Airplane, Serial No. 859,526, filed December 14, 1959, now Patent Number 3,056,564.

The object of this invention is to simplify the folding of the wings of an aircraft into the minimum space with respect to the overall length and width of the fuselage.

Another object is to fold the wings one on top of the other, and also in the folding sequence to move mechanically the folded wing-package forward with respect to the normal extended position of the inner wings. The object is to perform this operation without the disassembly of the primary wing supporting struts.

Another object is to ease the problem of folding the wings so that the wings can be folded by one person unassisted.

Another object is to provide a simplified wing-folding means that may be power actuated by mechanical means to fold the wings with one wing over the other on top of the fuselage and to move the folded wing-package forward with respect to the inner wing position in the extended position.

Another object is to provide a simplified wing-folding means to fold the wings into a minimum space so that the wings can be carried on combination aircraft that are designed for easy conversion for driving the vehicle on the road with the wing group carried on top of the fuselage of the said vehicle.

I have chosen for the illustration of my invention an airplane with a pusher propeller located on the tail. My invention, however, may be adapted to airplanes with other configurations.

With the above and other objects in view, the invention consists of certain novel details of construction and combination of parts hereinafter fully described and claimed, it being understood that various modifications may be resorted to within the scope of the appended claims without departing from the spirit or sacrificing any advantage of the invention.

This application is a continuation of my prior patent application for Folding Wings on Aircraft, Serial No. 858,976, filed December 11, 1959, now abandoned, on which seven claims were allowed. The allowed claims did not cover some of the important features of the invention, making it possible to circumvent the intent of the patent.

In the accompanying drawings forming a part of this specification, all like numbers indicate identical parts. Like numbers followed by L or R indicate similar parts of opposite hand.

In the drawings:

FIGURE 18 is a fragmentary view of enlarged scale taken on the line 18—18 in FIGURE 5.

FIGURE 19 is a view taken on the line 19—19 in FIGURE 18.

FIGURE 20 is a fragmentary sectional view in enlarged scale taken on line 20—20 in FIGURE 4 showing the lock to retain the wings in the folded configuration.

FIGURE 21 is a fragmentary sectional view in enlarged scale taken on line 21—21 in FIGURE 6.

This invention is related to my prior patent. Folding Wing on Aircraft, Patent Number 2,338,751. In practice, the said patented invention was found impractical and it was difficult to fold the wings because the wing struts 11 and 12 of said patent had to be detached from the fuselage 15. One man unassisted was unable to fold the wings. An assistant was required as one man supported the wings while another detached the said struts 11 and 12 from the fuselage 15 of said patent. In relatively minor breezes the wing became difficult for a man to support when the wing struts were removed. The time required to fold the wings was excessive because it was necessary to detach the struts from the fuselage. The disassembly of the wing struts as shown in the subject Patent 2,338,751 makes it impossible to fold the wings by adapting mechanical actuators which is proposed in this disclosure.

Figure 1:
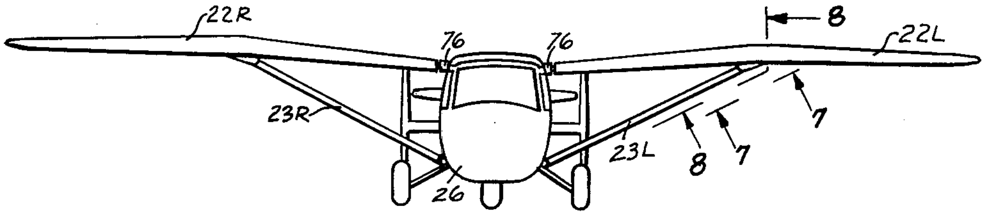
FIGURE 1 is a front view of the airplane with the wings extended.
Figure 2:
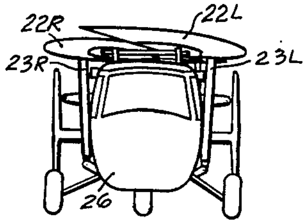
FIGURE 2 is a similar front view of the airplane with the wings folded.
Figure 3:
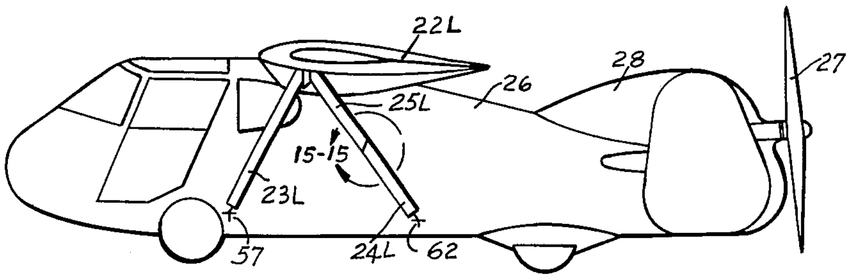
FIGURE 3 is a side view of the airplane with the wings extended.
Figure 4:
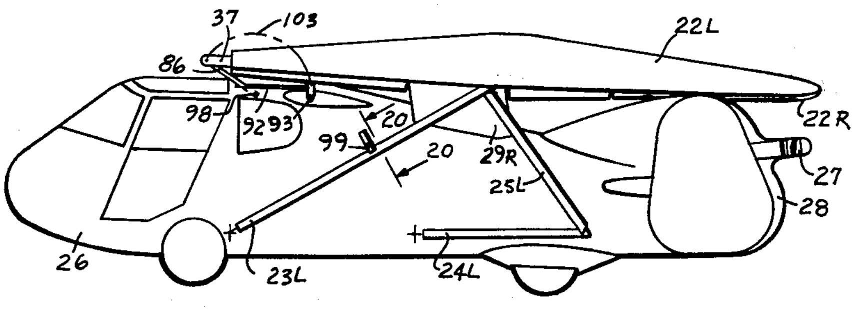
FIGURE 4 is a similar side view of the airplane with the wings folded.
Figure 5:
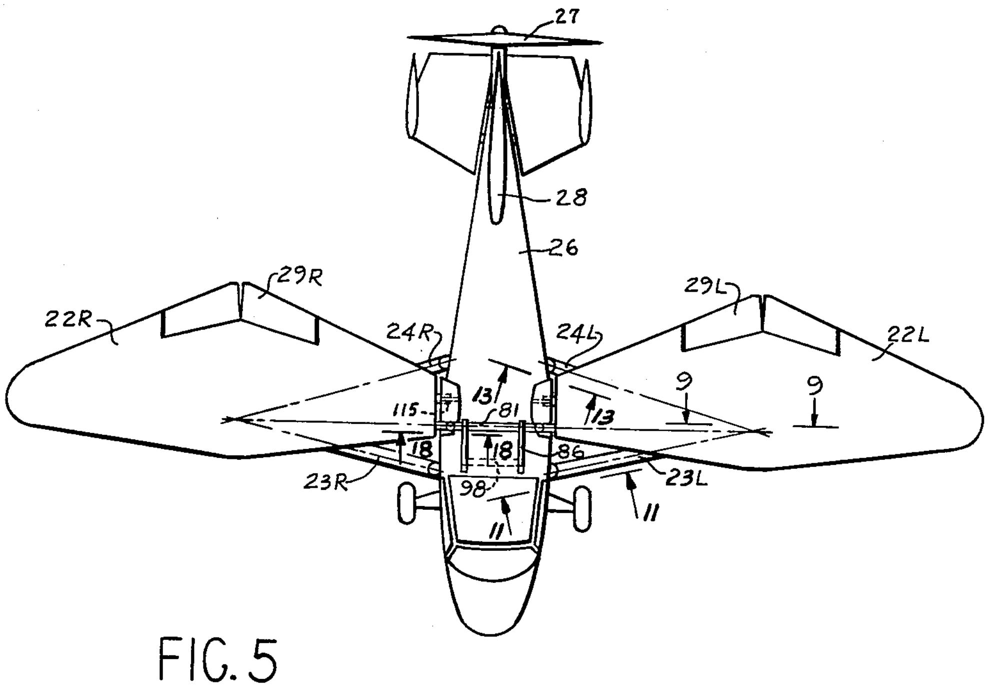
FIGURE 5 is a plan view of the airplane with the wings extended.

As shown in FIGURES 1, 3 and 5 the airplane is a high wing monoplane with a pusher propeller 27 supported at the trailing edge of the center fin 28. The pilot and passenger are in the forward part of the aircraft. This configuration permits the wings 22L and R to be folded with the struts 23L and R attached to the fuselage 26. The struts 23L and R lie parallel to the fuselage as shown in FIGURES 2 and 4 when the wings are folded. The struts 23L and R in this configuration do not interfere with ingress and egress of the pilot and passengers.

The wings 22 are supported by two struts 23 and 24–25 which form an inverted V-frame as shown in FIGURE 3. These struts meet at an apex at the wing 22. The wing struts 23 and 25 attach to a wing axial member 37 in FIGURE 7 within the wing 22. The member 37 extends in board to the inner end of the wing 22 and attaches to the fuselage 26 by means of fitting 77 in FIGURES 18 and 19. The wing 22 is attached to the axial member 37 by means of fittings 46 and 106 in FIGURES 8, 9 and 19. A limited rotational movement of the wing 22 about the member 37 is permitted by the said fittings.

Figure 6:
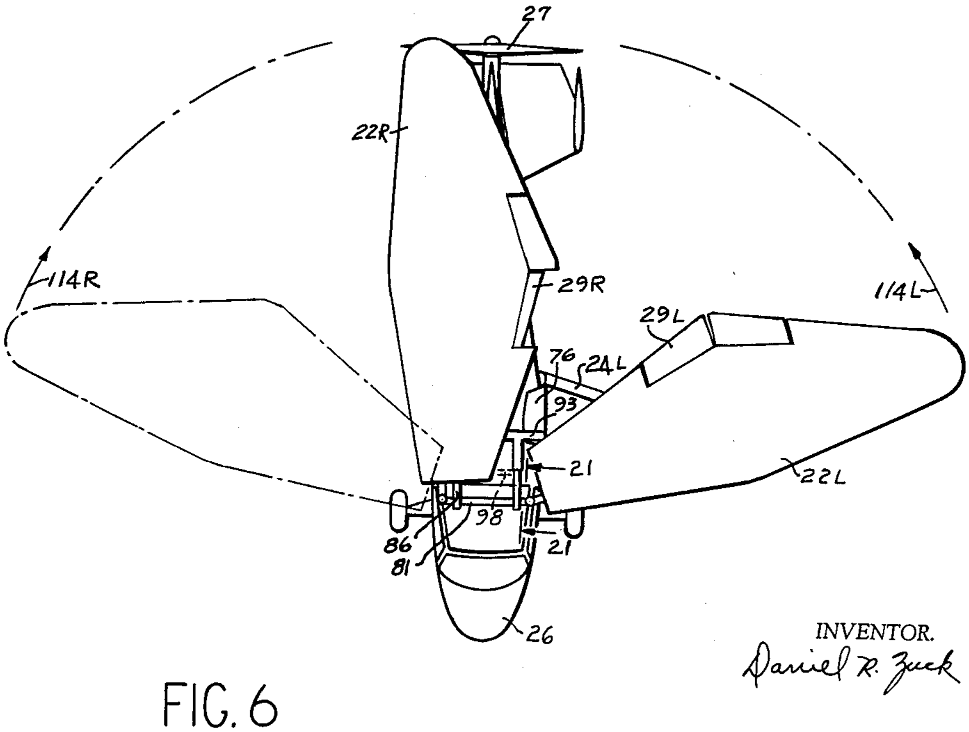
FIGURE 6 is a similar plan view of the airplane with the right wing in the folded position and the left wing is poised for final rotation into the folded position.

The wings 22 are interconnected across the top of the fuselage 26 by means of the transverse member 81 in FIGURES 6, 18 and 19. Member 81 is connected to member 37 by means of the universal coupling 80. Fitting 80 connects to 81 and 87, which is structurally integral with 37, by means of bolts 78 and 84. The nuts 79 and 85 secure the said bolts.

The transverse member 81 is secured to the wing folding carriage consisting of members 86 and 98 in FIGURES 4, 5, 6, 19 and 21 by means of the bearing 83 in FIGURES 18 and 19. The said bearings 83 bear against the thrust collar 82 which is fixedly secured to member 81. The member 98 of the wing folding carriage is rotationally secured to the fuselage 26 by the bearing 94 which is structurally secured to the said fuselage 26 as shown in FIGURE 21.

Figure 7:
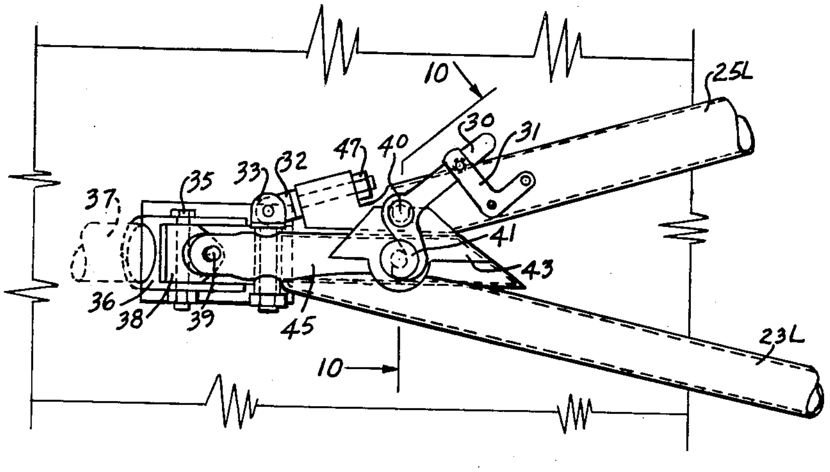
FIGURE 7 is a fragmentary view of enlarged scale taken on line 7—7 in FIGURE 1.
Figure 8:
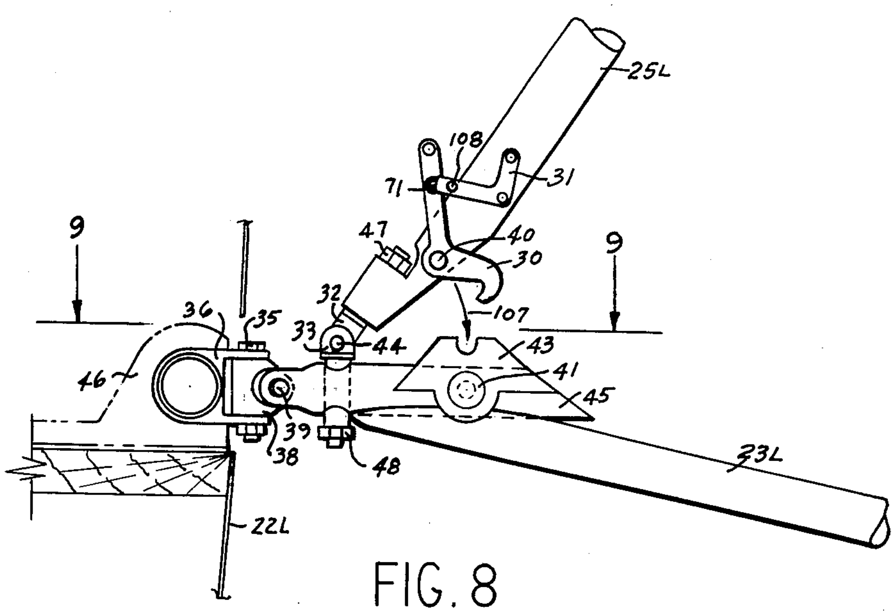
FIGURE 8 is an enlarged scale sectional view taken on line 8—8 in FIGURE 1 showing the wing struts in the unlocked relationship.
Figure 9:
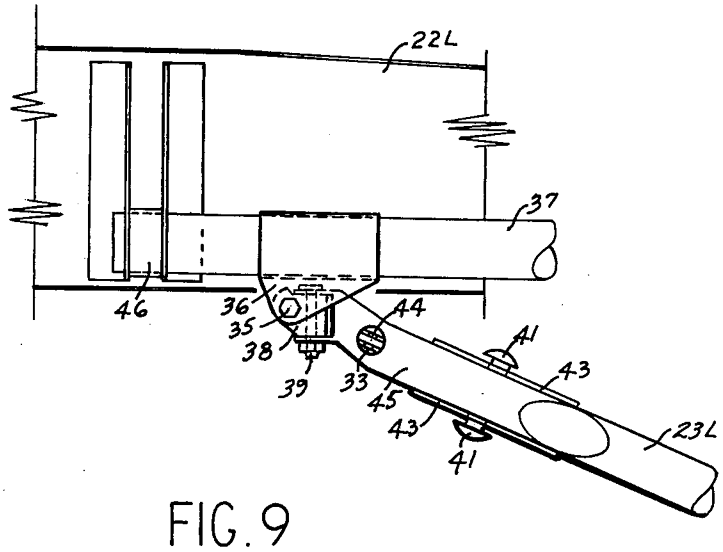
FIGURE 9 is a fragmentary sectional view taken on line 9—9 in FIGURE 8 with the wing and wing strut in the normal angular relationship; or a fragmentary sectional view taken on line 9—9 in FIGURE 5.

At the apex formed by the intersection of struts 23 and 25 the wing 22 is connected by means of the universal coupling 38 shown in FIGURES 7, 8, and 9. The coupling 38 is connected to the member 37 through the fitting 36 by means of the bolt 35. The universal coupling 38 is connected to the strut 23 through the member 45 which is structurally integral with the strut 23. Member 45 has a forked end which is pinned to the coupling 38 by means of the bolt 39.

The rear strut 25 is connected to the member 45 for universal movement with respect to the strut 23. Strut 23 is connected to member 45 by means of the eye bolt 32 and clevis ended bolt 33 in FIGURES 7, 8, and 9. The bolts 32 and 33 are pinned together by a bolt through the hole 44. The strut 25 has a fitting to receive bolt 32 and the nut 47 secures the strut 25 to the bolt 32; likewise the nut 48 secures the clevis ended bolt 33 to 45. Bolts 32 and 33 are free to turn in their respective fittings, and in respect to each other.

Strut 25 also has a lock 30 hingedly secured to the strut 25 at 40 as shown in FIGURES 7 and 8. The hooklike end of 30 engages the stud 41 with a rivetlike head as shown in FIGURE 9. The stud 41 is fixedly secured to the member 45 through the fitting 43. The fitting 43 has a slotted hole as shown in FIGURE 8 which receives the spacer 42, which is coaxial with pin 40 as shown in FIGURE 10, when strut 25 is rotated in the direction of arrow 107 in FIGURE 8.

Figure 10:
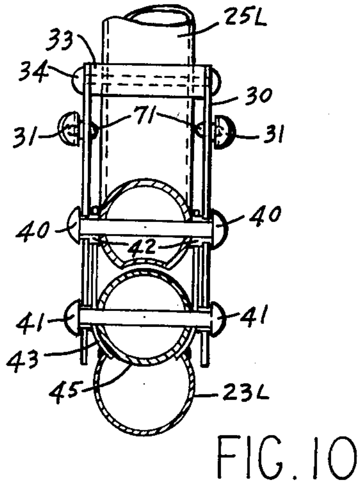
FIGURE 10 is an enlarged sectional view taken on line 10—10 in FIGURE 7.

Strut 25 also has a spring safety latch 31 which engages the lock 30 by means of stud 71 and detent 108 in FIGURES 8 and 10.

Figures 11, 12, 13, 14:
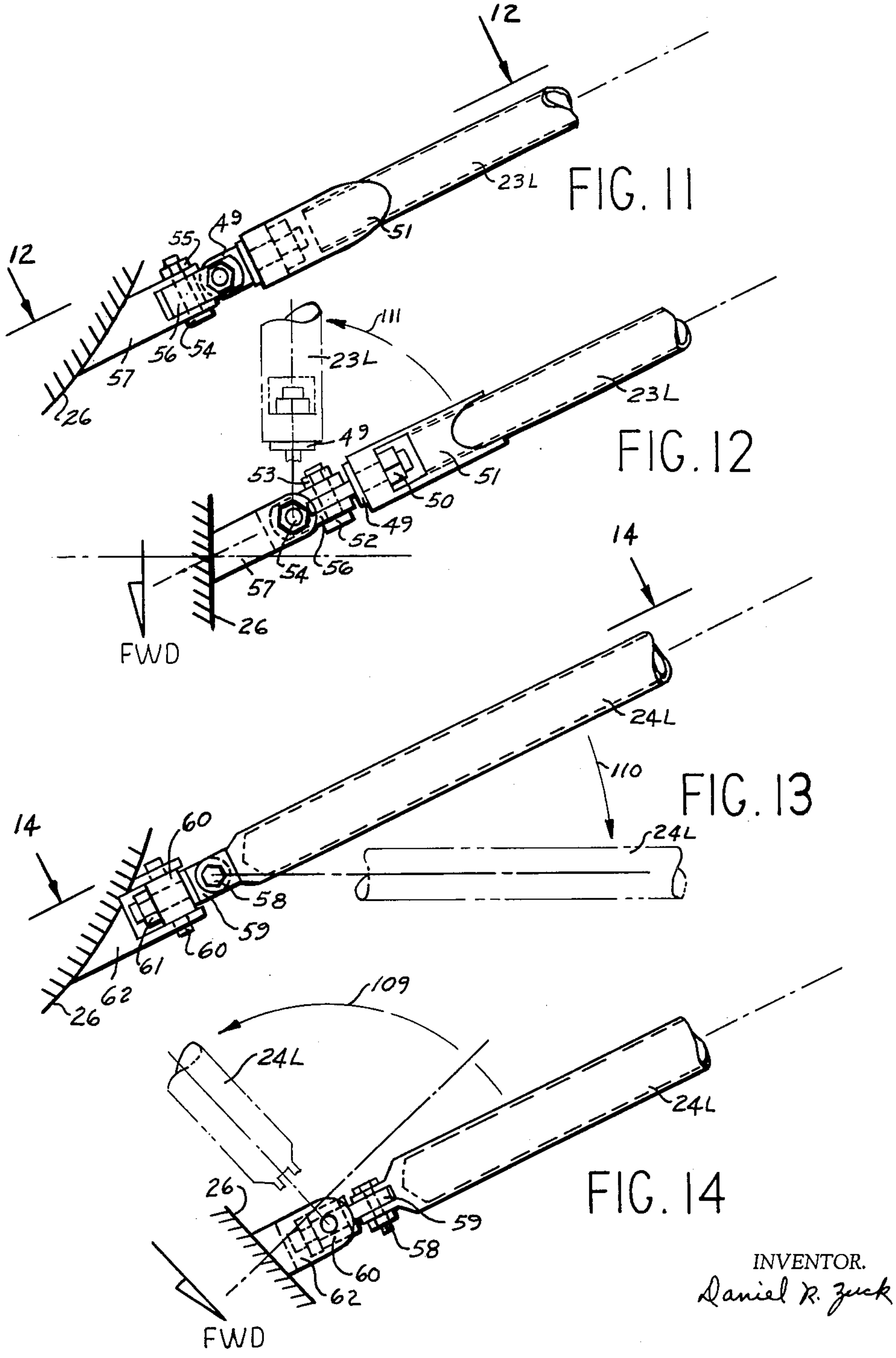
FIGURE 11 is a fragmentary section taken on line 11—11 in FIGURE 5 enlarged in scale showing the front wing-strut and fuselage relationship.
FIGURE 12 is a sectional view taken on line 12—12 in FIGURE 11 showing the fuselage and wing-strut relationship in the plane of the strut.
FIGURE 13 is a fragmentary section taken on line 13—13 in FIGURE 5 showing the rear wing-strut relationship with the fuselage.
FIGURE 14 is a sectional view taken on line 14—14 in FIGURE 13 showing the wing-strut relationship to the fuselage in the plane of the wing-strut.

The forward supporting strut 23 of the wing 22 is universally coupled to the fuselage 26 and to the fitting 57 which is fixedly secured to the fuselage 26 as shown in FIGURES 11 and 12. A universal coupling 56 which engages an eye bolt 49 permits the strut 23 to rotate axially and to pivot universally. The coupling 56 and bolt 49 are joined to the strut 23 and fitting 57 by means of bolts 52, 54 and by nuts 50, 53 and 55. The strut 23 is free to move in the direction of arrow 111 in FIGURE 12.

The lower segment of the rear supporting strut 24 of the wing 22 is universally coupled to the fuselage 26 as shown in FIGURES 13 and 14. A coupling block 60 engages the bolt end of the eye bolt 59, which is free to rotate in the block 60, thereby giving the strut 24 freedom of axial rotation. The strut 24 is connected to the eye bolt 59 by means of a clevis end on the said strut 24 and pinned by the bolt 58 secured with the nut. The strut 24 is free to move in the directions of arrows 109 and 110 in FIGURES 14 and 13.

Figure 15:
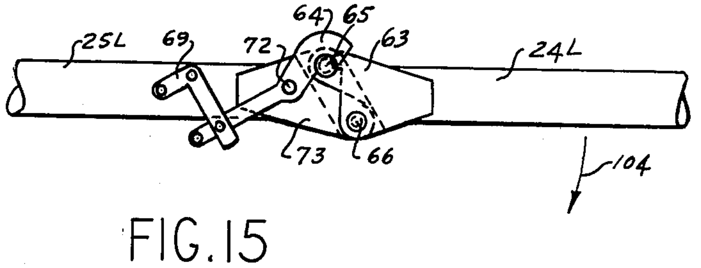
FIGURE 15 is a fragmentary detail view in enlarged scale of the rear wing-strut taken within the circle 15—15 in FIGURE 3.
Figures 16, 17:
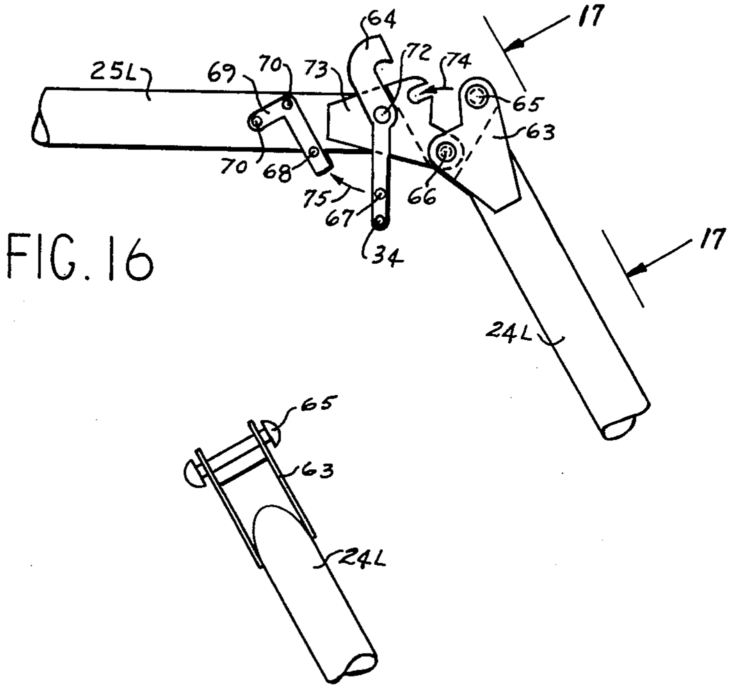
FIGURE 16 is a detail view similar to FIGURE 15 with the strut unlocked and partially rotated toward the folded configuration.
FIGURE 17 is a view taken on line 17—17 in FIGURE 16 showing the segment adjoining the fuselage of the rear wing-strut.

Each of the rear supporting struts of the wing 22 is composed of lower segment 24 and an upper segment 25. The segments are joined by a pinned connection 66 in FIGURES 15 and 16. The struts 24 and 25 mate through fittings 63 and 73 fixedly secured to the respective struts. A lock 64 shown secure in FIGURE 12 and unlocked in FIGURE 16 is hingedly secured to 73 by means of the pin 72. The spring safety latch 69 secures the lock 64 in the locked position of FIGURE 15 by means of the stud 67 which engages the detent 68 in the latch 69. The fitting 73 has a slotted hole which engages the pin 65 with the rivet like head in FIGURE 17 when the segmental strut 24 is rotated in the direction of the arrow 74 and the lock 64 engages said pin 65.

A releasable lock pin 88 in FIGURES 18 and 19 secures the wing 22 through the member 87 to the fuselage 26. The pin 88 is manually released by means of the actuated handle 91 when it is moved in the direction of the arrow 112. The handle 91 connects to the pin 88 by means of link 90 and the pins 89. The handle 91 is hingedly pinned at 89 to the fitting 113 which is fixedly secured to the structure of the fuselage 26.

When the wings are in the folded configuration as shown in FIGURES 2, 4 and 6, a lock 99 as shown in FIGURE 20 secures the wings by locking the strut 23 to the fuselage 26. The lock 99 engages strut 23 by the arcuate movement in the direction of the arrow 102. The lock 99 is hingedly secured to the fuselage 26 through the pinned connection 101 to the fitting 100 which is fixedly secured to the said fuselage 26.

The inner wing carriage members 86, 83 and 98 in FIGURES 5, 6, 18, 19 and 21 are locked in the forward position as shown in FIGURE 21 when the wings are folded by means of a removable pin through member 86, which engages a lug 96, which is fixedly secured to the fuselage 26. The slots 92 shown in FIGURES 4, 6, 18, 19 and 21 permit the carriage to be recessed into the fuselage 26 and permit the inner ends of the wings to be carried from the unfolded to the folded configuration and vice versa. The slot 93 shown in FIGURES 4, 6 and 19 permit the transverse member 81 in FIGURES 5, 6, 18 and 19 to be recessed into the fuselage when the wings 22 are extended and to carry the member 81 into the folded configuration in the arcuate path 103 shown in FIGURE 4.

Flap 29R on the wings 22R must be dropped down as shown in FIGURE 4 to clear the strut 23L when the wings are in the folded configuration. Flap 29R is secured to the wing 22R by means of a hinged connection which is not shown. Releasable means, also not shown, is provided to allow the flap 29R to rotate downward when the wings are folded.

The sequence of folding the wings is relatively simple. One man can easily perform the operation. In the first operation the lever 91 in FIGURE 19 is moved in the direction of arrow 112. There is a similar lever on the opposite side of the fuselage. The member 81 is then carried in the arcuate path 103 in FIGURE 4 about pivot bearing 94 in FIGURE 21. The wings are latched forward as shown in FIGURE 6 by means of pin 95 in FIGURE 21.

The wing 22R is ready to be moved in the arcuate direction of arrow 114R in FIGURE 6 after the locks 30 and 64 are released as shown in FIGURES 8 and 16. Strut segments 25 and 24 can then rotate with respect to each other as indicated by arrow 104 in FIGURE 15. As the wings 22L and R travel in the arcuate paths 114L and R in FIGURE 6, the struts 23L and R move in the arcuate path 111 in FIGURE 12 and strut segments 24L and R have a compound movement in the arcuate paths of arrows 109 and 110. The relationship of the struts 23, 24 and 25 with respect to each other in the final folded configuration is shown in FIGURE 4 when the locks 99 of which one is shown in FIGURE 20 secure the wings in the folded configuration. Before the wing 22L is rotated toward the folded position indicated by arrow 114L in FIGURE 6, the surface 29R is released toward the downward position shown in FIGURES 4 and 6 and described in the second paragraph above.

The operation of folding the wings is now completed. It was accomplished by one man unassisted without disassembly of any of the components. To extend the wings the reverse procedure is used and all the parts automatically fall into their mating receptacles and are easily locked in the reverse to the procedure described above. The reverse operation is also easily and quickly acomplished by one person unassisted. Manually lifting wings at the outboard ends with the main supporting struts removed is not required, as is disclosed in my prior invention 2,338,751.

It is anticipated that folding the wings as disclosed in this application may be accomplished by adapting electrically powered actuators or other means to the operations described, thereby enabling the operator to control the folding of the wings while he remains seated within the aircraft. This is an ultimate objective of this invention making a convertible vehicle, a combination airplane and automobile, feasible for operation by women and the unskilled.

Having described my invention, what I claim new and desire to protect by Letters Patent is:

1. In an aircraft, a fuselage, wings on the fuselage, means connecting the wings to the fuselage comprising hinges for universal motion of the wings with respect to the fuselage and having releasible locking means to permit folding the wings and locking the wings in the extended position, the wing connecting means to the fuselage having substantially vertical wing folding axes inboard of the wings at the fuselage, the wing folding axes and wing connecting means to the fuselage being respectively positioned to permit one wing to lay substantially over the other wing with both wings folded on top of the fuselage placing the semi-span of the wings substantially parallel with the fuselage, forward and aft wing supporting strut members extending outwardly from the fuselage forming an inverted V-frame on each side of the fuselage, the apex of the inverted V-frames comprising universally hinging means connecting to the wings to support the wings and to permit folding the wings, the forward struts of the inverted V-frames being universally hinged at their lower ends and connected to the fuselage at a point substantally aligned vertically with the wing folding axes at the fuselage, the aft struts of the inverted V-frames having universally hinged connecting means to the forward struts at their upper ends near the wings and at the lower ends to the fuselage, the upper ends of the aft struts having releasible locking means fixedly securing the aft struts to the forward struts when the wings are extended and permitting the wings to be folded when the locking means are released, hinging means with releasable locking means on the aft struts between the fuselage connections and the upper connections to the forward struts allowing the effective lengths of the aft struts to be shortened by means of the elbow-like motion of the aft struts when the wings are folded substantially parallel with the fuselage, releasable locking means to retain the wings in the folded position substantially parallel to the fuselage, the wing connecting means and folding hinges of the struts and wings respectively being positioned to permit the wings and struts to be folded and extended with the struts supporting the wings while the struts of the inverted V-frames remain connected with the wings and fuselage.

2. An aircraft as in claim 1 having a wing folding carriage comprising center section members across the fuselage interconnecting the wings, the wing connecting members having shiftably supported means on the fuselage for movement longitudinally of the fuselage, the wing center-section connecting members being universally connected to the inner ends of the wings substantially at the wings to fuselage connections, means permitting the wing connecting members to shift the inner ends of the wings forward when the wings are folded and to shift the inner ends of the wings aft when the wings are extended, releasable locking means to retain the inner ends of the wings in the forwardly shifted position when the wings are being folded.

3. In an aircraft, a fuselage, monoplane wings on the fuselage, wing connecting means on the fuselage to fold the wings on top of the fuselage substantially parallel to the fuselage with one wing on top of the other wing and means on the fuselage to extend the wings laterally for flight, forward and aft wing supporting strut members extending outwardly from the fuselage forming an inverted V-frame on each side of the fuselage, the apex of the inverted V-frames comprising universally hinging means connecting to the wings to support the wings and to permit folding the wings, the forward struts of the inverted V-frames being universally hinged at the lower ends and connected to the fuselage at a point substantially aligned vertically with the wing folding means at the fuselage, the aft struts of the inverted V-frames having universally hinged connecting means to the forward struts at the upper ends near the wings and at the lower ends to the fuselage, hinging means with releasable locking means on the aft struts between the fuselage connections and the upper connections to the forward struts at the wings allowing the effective lengths of the aft struts to be shortened by means of the elbow-like motion of the aft struts on the said hinges when the wings are folded substantially parallel with the fuselage, the wing connecting means and folding hinges of the struts being located respectively to permit the folding and extending of the wings and struts while the struts are supporting the wings with the struts of the inverted V-frame remaining secured to the wings and fuselage.

4. An aircraft as in claim 3 having in the center section between the wings for folding the wings a wing folding carriage shiftably mounted on the fuselage for fore and aft adjustment, and the wings universally connected at their inner ends to the wing folding carriage and to the fuselage whereby the wings may be either extended laterally in a common plane for flight, or shifted forward relative to the fuselage permitting the wings to be folded horizontally one above the other above the fuselage substantially parallel with the fuselage.

5. An aircraft as in claim 4 having releasable locking means to retain the wings in the folded position substantially parallel with the fuselage when locked and to permit the wings to be extended for flight when the locking means are released.

6. An aircraft as in claim 5 having releasable locking means at the apex of the inverted V-frame joining the forward struts with the aft struts providing the apex of the inverted V-frame with rigidity to support the wings when the locking means are locked and when released permitting the wings and struts to be folded substantially parallel with the fuselage.

7. In an aircraft, a fuselage, wings on the fuselage having connecting means to the fuselage for folding the wings, forward and aft wing supporting strut members extending outwardly from the fuselage forming as inverted V-frame on each side of the fuselage, the inverted V-frames comprising universally hinging means connecting to the wings to support the wings and to permit folding of the wings, the forward struts of the inverted V-frames being universally hinged at the lower ends and connected to the fuselage at a point substantially aligned vertically with the wing folding means at the fuselage, the aft struts of the inverted V-frames having universally hinged connecting means to the forward struts at the upper ends near the wings and at the lower ends to the fuselage, hinging means with releasable locking means on the aft struts between the fuselage connections and the upper connections to the forward struts at the wings allowing the effective lengths of the aft strut to be shortened by means of the elbow-like motion of the aft struts on the said hinges when the wings are folded, the wing connecting means and folding hinges of the struts being located respectively to permit folding and extending of the wings and struts while the struts are supporting the wings with the struts of the inverted V-frame remaining secured to the wings and fuselage.

8. In an aircraft, a fuselage, wings on the fuselage, means connecting the wings to the fuselage comprising hinges for universal motion of the wings with respect to the fuselage and having releasable locking means to permit folding of the wings and locking of the wings in the extended position, the wing connecting means to the fuselage having substantially vertical wing folding axes inboard of the wings at the fuselage, the wing folding axes and wing connecting means to the fuselage being respectively positioned to permit one wing to lay substantially over the other wing with both wings folded on top of the fuselage placing the semi-span of the wings substantially parallel with the fuselage, forward and aft supporting strut members extending outwardly from the fuselage forming inverted V-members on each side of the fuselage, the apex of the inverted V-frames comprising universally hinging means connecting to the wings to support the wings and to permit folding the wings, the forward struts of the inverted V-frames being universally hinged at their lower ends and connected to the fuselage at a point substantially vertically with the wing folding axes at the fuselage, the aft struts of the inverted V-frames having hinged connecting means at the fuselage and at the wings, releasable locking means on the aft struts to permit the wings to fold aft about the vertical folding axes formed by the connecting hinges to the fuselage of the wings and forward struts.

9. An aircraft as in claim 8 having a wing folding carriage comprising center section members across the fuselage interconnecting the wings, the wing connecting members having shiftably supoprted means on the fuselage for movement longitudinally of the fuselage, the wing center-section connecting members being universally connected to the inner ends of the wings substantially at the wings to fuselage connections, means permitting the wing connecting members to shift the inner ends of the wings forward when the wings are folded and to shift the inner ends of the wings aft when the wings are extended, releasable locking means to retain the inner ends of the wings in the forwardly shifted position when the wings are folded.

10. In an aircraft, a fuselage, wings on the fuselage, a wing folding carriage on the fuselage for folding the wings aft substantially parallel with the fuselage and placing the wings substantially one over the other on top of the fuselage comprising center-section members across the fuselage to interconnect the wings, means for movement of the carriage longitudinally on the fuselage to move the inner ends of the wings forward to fold the said wings and to move the inner ends of the wings aft to extend the said wings for flight, releasable locking means to retain the wings and folding carriage in the positions with the wings folded and alternately extended for flight, extending outward from each side of the fuselage and connecting to the wing folding carriage wing supporting structure comprising axle means with rotatable bearing supporting means for the left and right wings respectively, the wing supporting axle means having substantially vertical hinge means at the folding carriage to permit the wings to be folded aft substantially parallel to the fuselage and having the bearing supporting means on the wings to permit the wings to adjust angularly for folding the wings substantially one over the other on top of the fuselage.

11. In an aircraft, a fuselage, wings on the fuselage, a wing folding carriage on the fuselage for folding the wings aft substantially parallel to the fuselage with the wings supported substantially one over the other on top of the fuselage comprising center-section members across the fuselage to inter-connect the wings, means for the movement of the wing carriage vertically on the fuselage to fold the wings aft on top of the fuselage substantially parallel to the fuselage and to extend the wings for flight, releasable locking means to retain the wings and carriage in the positions with the wings folded and alternately extended for flight, extending outwardly from each side of the fuselage and connecting to the wing folding carriage wing supporting structure comprising axle means with rotatable bearing support means for the left and right wings respectively, the wing supporting axle means having substantially vertical hinge means at the folding carriage to permit the wings to be folded aft substantially parallel to the fuselage and having the bearing supporting means on the wings to permit the wings to adjust angularly for folding the wings substantially one over the other on top of the fuselage.

References Cited in the file of this patent

UNITED STATES PATENTS

| | | |
|---|---|---|
| D. 153,331 | Zuck | Apr. 5, 1949 |
| 1,228,375 | Tarbox et al. | May 29, 1917 |
| 2,660,602 | Holland | Jan. 19, 1954 |

FOREIGN PATENTS

| | | |
|---|---|---|
| 532,566 | France | Nov. 17, 1921 |